Oct. 2, 1923.

L. W. SHELDON

POWER TRANSMISSION DEVICE

Filed Dec. 21, 1920

1,469,700

Inventor
Lewis W. Sheldon
By his Attorney

Patented Oct. 2, 1923.

1,469,700

UNITED STATES PATENT OFFICE.

LEWIS W. SHELDON, OF BROOKLYN, NEW YORK.

POWER-TRANSMISSION DEVICE.

Application filed December 21, 1920. Serial No. 432,300.

*To all whom it may concern:*

Be it known that I, LEWIS W. SHELDON, a citizen of the United States, and resident of the borough of Brooklyn, county of Kings, city and State of New York, have invented certain new and useful Improvements in Power-Transmission Devices.

This invention relates to improvements in power transmission devices and its principal object is to provide a device wherein power may be transmitted from one shaft to another independent shaft arranged in alignment and in such a manner as to permit the aligned shaft to rotate with greater speed than the driving shaft under external influence.

Another object of the invention is to provide a device which may be utilized as a differential mechanism for motor vehicles and the like where it is necessary that one wheel travel more rapidly than the other when rounding corners.

A still further object of the invention is to provide a differential mechanism such as described above which is designed so that an equal amount of power will be transmitted to both driving wheels independently, whereby danger of one of the wheels slipping and the other remaining stationary when the vehicle becomes mired, is avoided thereby overcoming much of the inconvenience accompanying the use of vehicles of this nature.

With the above and other objects in view the invention consists of a novel construction, combination and arrangement of parts which will be fully set forth in the following specification, claimed and illustrated in the accompanying drawings, in which:—

Figure 2:
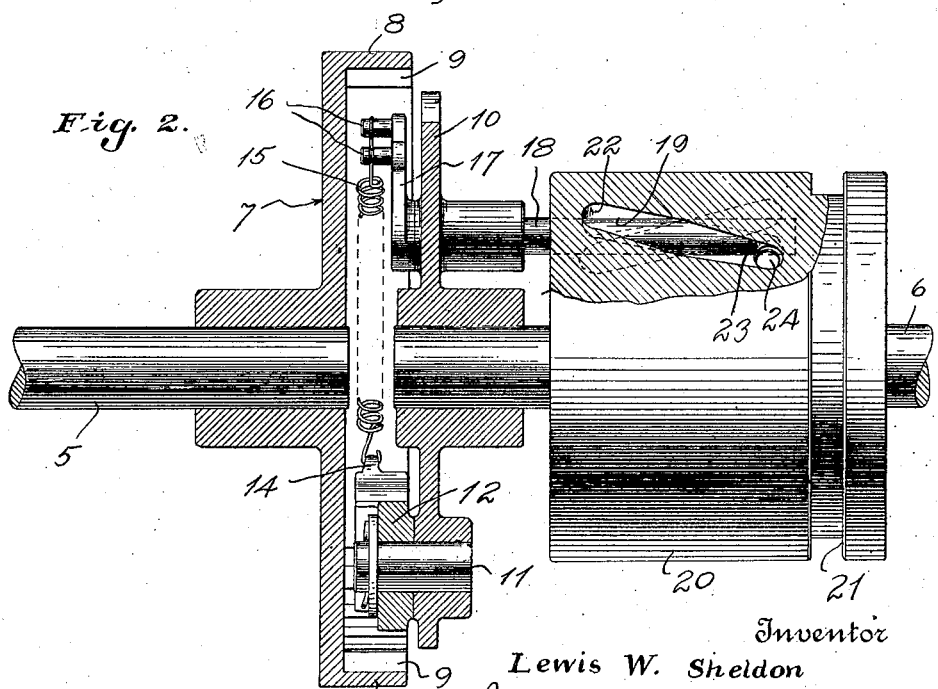
Fig. 2, is a vertical sectional view through the device assembled.

Referring to the drawings in detail, the numeral 5 designates the driven shaft of the device while the numeral 6 designates the drive shaft. As illustrated in Fig. 2 the shafts 5 and 6 are arranged in alignment and shaft 5 has secured adjacent its inner end a drum 7 provided with an angular flange 8 extending at right angles to its inner face. The inner face of the flange 8 is provided with a plurality of teeth 9 which are adapted to be engaged by the rocking pawl which will be more fully hereinafter described.

Figure 1:
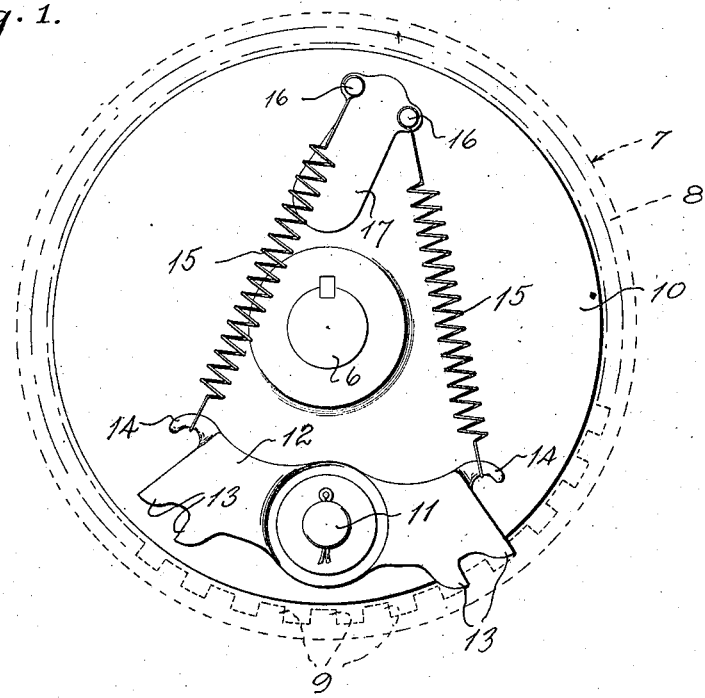
Fig. 1, is an interior face view of one of the operating elements of this device illustrating the cooperating element in dotted lines.

Fixed to the inner end of the drive shaft 6 is a disk 10 of a slightly less diameter than the inner ends of the teeth 9 and secured in said disk is a stud 11 upon which the rocking pawl 12 is mounted. This pawl 12 is provided on its outer side and adjacent opposite ends with teeth 13 which are adapted to cooperate with teeth 9 in the manner illustrated in Fig. 1. Suitable hooks 14 are arranged at opposite ends of the pawl and have connected thereto the retractile coil springs 15, the opposite ends of which are connected to studs 16 carried by the spring controlling lever 17. This lever 17 is secured to the inner end of the rock shaft 18 which extends through the disk 10 and is received in a bore 19 formed in the shifting sleeve 20.

The shifting sleeve above referred to is provided adjacent its outer end with an annular groove 21 which is designed to receive a shifting fork (not shown). Extending longitudinally of the sleeve 20 and on opposite sides of the bore 19 are guide slots 22 which are spirally arranged with relation to the bore and receive rollers 23 which are carried on studs 24 projecting laterally from the shaft 18 in planes at right angles to the longitudinal axis of the lever 17.

It will thus be seen that as the sleeve 20 is shifted longitudinally on the shaft 6, the shaft 18 will be partially rotated to throw the lever 17 either to the right or left.

In operation it will be assumed that the shaft 6 is driving in a clock-wise direction and in order to transmit power to the shaft 5, the sleeve 20 is withdrawn or moved away from the disk 10 until the rollers 23 engage the ends of the slots 22 adjacent the disk 10. Obviously such movement will cause the shaft 18 to partially rotate and cause the spring 15 on the right side of Fig. 1 to exert pull on the pawl 12 so as to rock the teeth 13 at the left side of the pawl into contact with the teeth 9 of the drum 7. The power then transmitted from the shaft 6 will be transmitted through the pawl 12 and thence through drum 7 to shaft 5, at the same time leaving the shaft 5 free to rotate in a clockwise direction at a speed greater than the speed of rotation of shaft 6. Upon reversing the direction of movement of shaft 6 and advancing the sleeve 20 toward disk 10, a pull will be exerted on the spring 15, to the left in Fig. 1, thereby causing the teeth 13 at the opposite end of the pawl 12 to engage the teeth 9 of the drum so that the shaft 5 will be positively driven in a counter clock-wise direction and at the same time the shaft 5 will be permitted to rotate in a counter clock-wise direction at a speed greater than the speed of the shaft 6.

While in the foregoing there has been shown and described a preferred embodiment of this invention, it is to be understood that certain minor changes in the details of construction, combination and arrangement of parts may be resorted to without departing from the spirit and scope of the invention as claimed.

What is claimed is:—

1. A power transmission device comprising a drum, a rockable member pivoted within said drum and having a plurality of teeth at each of its ends and expansible springs, one arranged at each side of the axis of said drum and secured one to each end of said rockable member and means for rocking said rockable member, said means consisting of a sleeve having an obliquely arranged slot and a shaft connected with one end of said springs and having a pin entering said slot.

2. A power transmission device comprising a drum provided with internally arranged teeth, a disc associated with said drum and a rockable member upon said disc and arranged wholly upon one side of the axis therefor, a plurality of teeth adjacent each end of said rockable member, a second rockable member upon said disc and a plurality of expansible springs, one at each side of the axis of said disc and connected to the ends of said first mentioned rockable member and to the second said rockable member.

3. A power transmission device comprising a drum and a shaft therefor, a disc associated with said drum and a shaft for said disc, the shafts of said drum and disc being arranged in axial alignment, a second shaft extending through said disc and a movable lever upon said second shaft, a pin entering said disc and a rockable member upon said pin, teeth within said drum and teeth upon the ends of said rockable member adapted to engage the teeth of said drum and a spring at each side of the axial center of said disc and connecting the rockable member with the said lever and means for changing the position of said lever to cause said springs to rock said rockable member.

Signed at the city of New York, in the county and State of New York, this 12th day of November, 1920.

LEWIS W. SHELDON.